United States Patent
Wixson et al.

(10) Patent No.: US 6,396,961 B1
(45) Date of Patent: *May 28, 2002

(54) METHOD AND APPARATUS FOR FIXATING A CAMERA ON A TARGET POINT USING IMAGE ALIGNMENT

(75) Inventors: Lambert Ernest Wixson, Rocky Hill, NJ (US); Robert Mandelbaum, Philadelphia, PA (US); Michael Wade Hansen, Lawrenceville, NJ (US); Jayakrishnan Eledath; Deepam Mishra, both of Plainsboro, NJ (US)

(73) Assignee: Sarnoff Corporation, Princeton, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/143,910

(22) Filed: Aug. 31, 1998

Related U.S. Application Data

(60) Provisional application No. 60/065,190, filed on Nov. 12, 1997, and provisional application No. 60/082,022, filed on Apr. 16, 1998.

(51) Int. Cl.[7] .................................................. G06K 9/32
(52) U.S. Cl. ........................ 382/294; 382/154; 382/282; 382/284
(58) Field of Search .............................. 382/293, 276, 382/294, 107, 106, 154, 103, 255, 295, 296, 282, 284; 348/174, 135, 137, 580, 584, 598; 345/419, 425; 701/25

(56) References Cited

U.S. PATENT DOCUMENTS

| | | | |
|---|---|---|---|
| 4,692,806 A | 9/1987 | Anderson et al. | ............ 358/209 |
| 5,557,684 A | * 9/1996 | Wang et al. | ................ 382/107 |
| 5,561,617 A | 10/1996 | Van der Wal et al. | .. 364/724.05 |

(List continued on next page.)

OTHER PUBLICATIONS

Burt et al. "Object tracking with a moving camera: an Application of Dynamic Motion Analysis," IEEE Workshop on Visual Motion, Irvine, California (Mar. 1989).

J.R. Bergen et al., Hierarchical Model–Based Motion Estimation, Proceedings of the European Conference on Computer Vision (1992).

M. Hansen et al., Real–time Scene Stabilization and Mosaic Construction, Workshop on Applications of Computer Vision (1994).

(List continued on next page.)

*Primary Examiner*—Leo Boudreau
*Assistant Examiner*—Kanji Patel
(74) *Attorney, Agent, or Firm*—William J. Burke

(57) ABSTRACT

A method for fixating a camera, mounted on a motorized mount, on a target point. The method includes receiving a plurality of images representative of a scene; selecting, within the plurality of images, a first display reference image containing the target point at a first coordinate location; estimating, in a current image within the plurality of images, a transformation that maps the current image to the first display reference image; estimating a second coordinate location of the target point in the current image using the transformation; computing an image slip between the target point in the current image and the target point in the first display reference image; converting the image slip into an angular correction for fixating the camera; modifying the angular correction by using closed-loop control with the motorized mount; and warping the current image using the transformation to align the current image with the first display reference image. This warping step provides a stable view of the scene even in the presence of camera movements that cannot be eliminated using mechanical stabilization, and in the presence of motor control lags and oscillations due to measurement and actuator latencies.

27 Claims, 4 Drawing Sheets

U.S. PATENT DOCUMENTS

| | | | | |
|---|---|---|---|---|
| 5,611,000 A | * | 3/1997 | Szeliski et al. | 382/294 |
| 5,629,988 A | | 5/1997 | Burt et al. | 382/276 |
| 5,764,786 A | * | 6/1998 | Kuwashima et al. | 382/107 |
| 5,793,901 A | * | 8/1998 | Matsutake et al. | 382/294 |
| 5,852,672 A | * | 12/1998 | Lu | 382/154 |
| 5,963,613 A | * | 10/1999 | Navab | 378/4 |
| 5,963,664 A | * | 10/1999 | Kumar et al. | 382/154 |

OTHER PUBLICATIONS

L. Wixon et al. "Image Alignment for Precise Camera Fixation and Aim," Proceedings of the IEEE Conference on Computer Vision and Pattern Recognition (Jun. 1998).

B.K.P. Horn, "Closed–Form Solution of Absolute Orientation Using Unit Quaternions," Journal of the Optical Society of America A (Apr. 1997).

* cited by examiner

METHOD AND APPARATUS FOR FIXATING A CAMERA ON A TARGET POINT USING IMAGE ALIGNMENT

This non-provisional U.S. national application, filed under 35 U.S.C. §111(a) claims, under 35 U.S.C. §119(e)(1), the benefit of the filing dates of provisional U.S. applications Ser. Nos. 60/065,190 and 60/082,022, filed under 35 U.S.C. §111(b) on Nov. 12, 1997 and Apr. 16, 1998, respectively.

This invention was made under U.S. Government Contract DAAB07-97-C-J031. The Government has certain rights in the invention.

TECHNICAL FIELD

The present invention relates, in general, to image processing systems and, more specifically, to a method and apparatus for fixating a camera on a target point using image alignment.

BACKGROUND OF THE INVENTION

During video surveillance or filming of a scene from a moving vehicle, such as an aircraft or car, a common problem is how to keep the camera centered on a stationary target in the scene. Such centering is desirable, because it results in the video looking stable and, therefore, easy to watch; video that does not stay locked on a point contains significant motions due to the moving platform. The motion makes the video look "jittery" and may even cause most of the desired scene to move out of the image sporadically. This problem is especially acute in situations where the field of view is narrow and the camera platform is subject to sudden changes in orientation, such as airborne surveillance.

The task of keeping a camera centered on a point is commonly referred to as "fixating" a point. Traditional approaches to fixating a point have primarily relied on mechanical stabilization to hold the camera steady. Typically, these approaches use gyroscopes to sense rotation of the camera platform, and motors to compensate for that rotation. However, the cost of such systems increases rapidly depending on the number of rotational axes, and the desired precision of the stabilization.

Recent approaches have added an electronic image matching device to supplement mechanical stabilization. The device operates on a small image region (typically of size 32×32 pixels) around the image center, and uses correlation matching to estimate the translational image motion of this region from one video frame to the next. With correlation matching, the amount of "image slip" may be measured. Image slip is the distance through which the center of the current image moves from the desired fixation point. This image slip may be converted to an angular correction and applied to a motorized pan/tilt camera mount in order to re-center the camera on the desired fixation point. In this manner, fixation may be achieved by a combination of mechanical stabilization and closed-loop pan/tilt control that uses correlation matching to measure the image slip. An implicit assumption of this correlation matching approach is that the patch motion in the image can be represented using a rigid <x,y> translation. If the patch motion differs from a pure translation, or if the patch contains insufficient texture, the motion estimates produced using this technique will contain errors. As these errors accumulate over time, the patch and the fixated point will drift off the target.

As is well known, there are video techniques for indicating moving objects from a stationary platform that operate by simply subtracting from the amplitude of each pixel of a current video image frame, the amplitude of that pixel in a stored preceding video image frame. This results in the substantial removal of those pixels that define stationary objects. Digital image processing techniques which may be employed in this frame difference approach are disclosed in U.S. Pat. No. 4,692,806, which issued on Sep. 8, 1987, and to Anderson et al., and is incorporated herein by reference.

Also incorporated herein by reference is an article by Burt et al. "Object tracking with a moving camera: an Application of Dynamic Motion Analysis," IEEE Workshop on Visual Motion, Irvine Calif., March 1989. Burt et al. teaches that if the camera is moving, it is often possible to compensate for resulting image motion by electronically shifting and rotating successive image frames to achieve alignment prior to computing a frame difference. Electronic alignment is based on a simple image warp (e.g., based on an affine transform) that is effective when scene motion contains relatively little parallax, such as when the camera is rotating, but not translating, or when objects within the region of the camera's field of view occur in a relatively narrow range of depths.

Further incorporated herein by reference is U.S. Pat. No. 5,629,988 issued to Burt and Hanna on May 13, 1997. This patent discloses a method for removing unwanted camera motion from processed and displayed video. It matches image frames between successive camera images, or between images and a stored reference image to determine camera-induced motion.

None of these disclosures, however, address the problem of fixation in which a selected target point is to be maintained centered in the camera's field of view. The image alignment technique of the present invention is directed to overcoming the problem of fixation, especially in the presence of motor latencies.

SUMMARY OF THE INVENTION

To meet this and other needs, and in view of its purposes, the present invention provides a method and apparatus for fixating a camera on a target point using image alignment. In one embodiment, the method includes the following steps:
a) receiving a plurality of images representative of a scene; b) selecting, within the plurality of images, a first display reference image containing the target point at a first coordinate location; c) estimating, in a current image within the plurality of images, a transformation that maps the current image to the first display reference image; d) estimating a second coordinate location of the target point in the current image using the transformation; e) computing an image slip between the target point in the current image and the target point in the first display reference image; f) converting the image slip into an angular correction for fixating the camera; g) modifying the angular correction by using closed-loop control with the motorized mount; and h) warping the current image using the transformation to align the current image with the first display reference image to obtain a stable view.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

Figure 1:
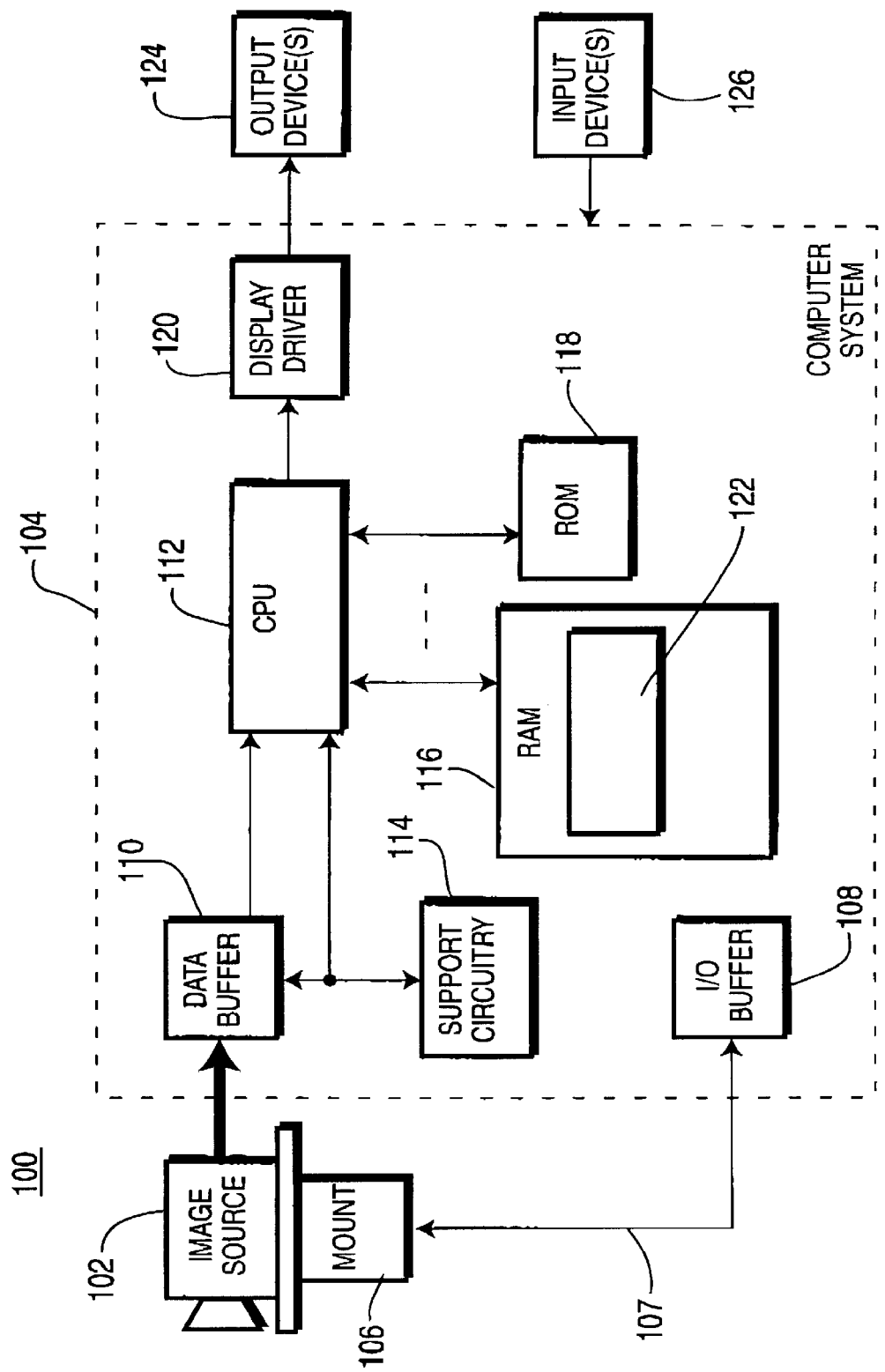
FIG. 1 is a block diagram of an apparatus for fixating a camera on a target using digital image processing techniques.

FIG. 1 depicts a block diagram of apparatus 100 for fixating a camera on a target suitable for implementing the present invention. The apparatus contains image source 102 stabilized on gimbaled mount 106, computer system 104, one or more output devices 124 and one or more input devices 126. Image source 102 may be a video camera, an infrared camera, or some other sensor that generates a series of two-dimensional images representing a scene. The apparatus generally processes digital images; therefore, if the image source produces analog images, a digitizer (not shown) may be used between the image source and the computer system.

General purpose computer 104 facilitates image processing, scene analysis and image display. Specifically, the computer system contains a data buffer 110, a central processing unit (CPU) 112, support circuitry 114, random access memory (RAM) 116, read only memory (ROM) 118, display driver 120, and input/output buffer 108. Additionally, a user may interact with the computer system through one or more input devices 126 such as a keyboard, mouse, trackball, touchpad, and the like. Also, the computer system displays the images on output device 124 such as a computer monitor. Alternatively, the computer system may also interact with other output devices such as an image processing system, which may, for example, convert a segment of image into a television signal or a printer to provide a "hard copy" of any display that appears on the computer monitor.

Data buffer 110 provides data rate equalization (frame buffering) between the image source and the CPU. Typically, this buffer is a first-in, first-out (FIFO) buffer. Such buffers are typically used to provide a constant data rate to the CPU while providing flexibility in the data rates that can be generated by an image source.

CPU 112 is typically a general purpose processor such as PowerPC, Pentium, or some other generally available processor. PowerPC is a registered trademark of International Business Machines of Armonk, N.Y. and Pentium is a registered trademark of Intel Corporation of Santa Clara, Calif. Since the software implementation of the present invention is not required to execute on any specific processor, the routines of the present invention can be executed upon any type of processor or combination of processors in a parallel processing computer environment. In addition, rather than using a general purpose computer, the scene analysis may be accomplished within a real-time image processor.

CPU 112 operates in conjunction with various other circuits such as RAM 116, ROM 118 and support circuitry 114 such as co-processor(s), clock circuits, cache, power supplies and other well-known circuits. Support circuitry may also include specialized hardware for accelerating image processing such as image warpers or filtering circuitry. One such filtering chip is the PYR-1 circuit described by van der Wal et al. in U.S. Pat. No. 5,561,617. The operation and interrelationship of these various computer components is well-known in the art and does not require further explanation. The display driver 120 may be a video card, printer driver or other common driver software or hardware as required by output device(s) 124.

RAM 116 stores the software implementation of the present invention. Typically, the routines of the invention are stored in a mass storage device (not shown) and recalled for temporary storage in RAM 116 when executed by CPU 112. In FIG. 1, the invention is embodied in image alignment routine 122.

Input/output (I/O) buffer 108 provides the appropriate data interface between computer system 104 and gimbaled mount 106. It will be appreciated that I/O buffer 108 may reside in side the computer system or externally to the computer system. Image alignment routine 122 provides control signals to gimbaled mount 106 to correct its spatial alignment so that the viewing angles of image source 102 may be repositioned in pan or tilt. This may be done with a conventional proportional-integral (PI) negative feedback loop wherein the pan and tilt motors (not shown) of mount 106 are commanded to achieve a velocity proportional to this correction.

Image alignment routine 122 is now described starting with definitions. The scene surface used in computing alignment is the "target surface" and its image in the camera is the "target image." A point on the target surface to which the camera is to be centered (fixated) is the "target point." The target surface may be all of the scene that is within the field of view of the camera and the target point may be assumed to be on the target surface. Fixation starts with an image in which the desired fixation point is a known image coordinate (for example, the image center). This image could be provided by the operator, or could come from other sources, as is described below. This image is the reference image.

Image alignment routine 122 relies on a sequence of video frames from image source 102 taken from different viewpoints. The sequence of video frames may be written as $$\{F_o, F_1, F_2, \ldots F_i, F_j, \ldots F_c, \ldots F_n\}$$

where $F_o$ is the display reference frame and $F_c$ is the current frame.

Let $_j^iM$ denote a transformation that warps frame $F_i$ to match frame $F_j$. The problem of image stabilization is to find all transformations $_t^oM$ t$\in\{1,2 \ldots, N\}$ and to display the "stabilized" images $_t^oM \cdot (F_t)$ for all t$\in\{0,1 \ldots, N\}$ in which each frame is warped to be aligned with the display reference frame.

Due to the large image motion that accumulates over time between the display reference and the subsequent frames (e.g., due to gradual changes in viewpoint), it is not feasible to directly estimate motion between them. Therefore, an alignment reference frame $F_r$ is maintained for which $_r^oM$ is estimated. The current frame $F_c$ is aligned to this frame $F_r$ yielding $_c^rM$. The desired transformation $_c^oM$ is then given by equation (1).

$$_c^oM = _r^oM \cdot _c^rM \qquad (1)$$

The alignment reference frame is replaced by the current frame whenever $_c^rM$ indicates that "significant" image displacements have occurred. It will be appreciated that this may occur whenever the average pixel motion exceeds 5 pixels.

It will also be appreciated that given a reference frame, electronic multi-resolution image processing methods may be used to estimate the parametric image transformation that best maps the current frame to the reference frame. These methods have been described and are known in the art. One such method is described by J. R. Bergen et al., in Hierarchical Model-Based Motion Estimation, Proceedings of the European Conference on Computer Vision, (1992), and is incorporated herein by reference.

Another method is described by M. Hansen et al., in Real-time Scene Stabilization and Mosaic Construction, Workshop on Applications of Computer Vision, (1994), and is incorporated herein by reference. Yet a third method is described by Burt et al., in U.S. Pat. No. 5,629,988, issued May 13, 1997 and is incorporated herein by reference.

It will be understood that the specific parametric transformation to be used may depend on the type of scene being viewed and the motion of the camera. The most typical transformations used are translational (consisting of 2 parameters, one for each image translation in two orthogonal coordinate directions aligned with the image) and affine (consisting of 6 parameters). This estimate does not necessarily have to be obtained by directly aligning the current frame with the reference frame. It may also be obtained by estimating the alignment between consecutive video image frames, starting with the image that was used as the reference frame. Given such a set of frame-to-frame alignments, the alignment between the current image and the reference image may be derived by cascading the frame-to-frame alignments in sequence. Image alignment has been described by L. Wixson, J. Eledath, M. Hansen, R. Mandelbaum, and D. Mishra, in "Image Alignment for Precise Camera Fixation and Aim," Proceedings of the IEEE Conference on Computer Vision and Pattern Recognition (June 1998).

In the embodiment described herein, whenever the average pixel motion exceeds 5 pixels, the $_r^oM$ estimate is updated by setting it to $_c^oM$. When $_c^oM$ becomes large, it is often useful to reset the display reference frame to avoid confusing a human observer; the display reference should bear some obvious resemblance to the current view. To perform this reset, the display reference $F_0$ and the alignment reference $F_r$ are both set to be the current frame, and $_r^oM$ and $_c^rM$ are both set to identity. This is described in detail below.

When the 3D surface being stabilized is a plane, the image motion between frames $_j^iM$ may be modeled as a 3×3 matrix, as shown in equation (2)

$$_j^iM = \begin{bmatrix} a & b & c \\ d & e & f \\ g & h & 1 \end{bmatrix} \quad (2)$$

that warps points (x',y',1) in frame $F_i$ to points (x"y"1) in $F_j$, where $$x'' = \frac{_j^iM_0 \begin{pmatrix} x' \\ y' \\ 1 \end{pmatrix}}{_j^iM_2 \begin{pmatrix} x' \\ y' \\ 1 \end{pmatrix}},$$

Similarly for y"

$$y'' = \frac{_j^iM_1 \begin{pmatrix} x' \\ y' \\ 1 \end{pmatrix}}{_j^iM_2 \begin{pmatrix} x' \\ y' \\ 1 \end{pmatrix}},$$

where $_j^iM_k$ denotes the k'th row of matrix $_j^iM$. By imposing constraints on various coefficients of this matrix, different parametric motion models may be used. For example, when g and h are forced to 0, $_j^iM$ is an affine transform.

As an example, during airborne surveillance an aircraft may fly a rough ellipse around the target point, resulting in an oblique view of the ground plane. The aircraft's small velocity along the camera's optical axis, coupled with the camera's narrow field of view, suggests that image motion may be modeled using an affine transformation. The affine motion is estimated using the above referenced real-time multi-resolution image alignment procedure described in M. Hansen et al. Shown therein is the utility of the affine model to align two oblique views, while the camera is translating, panning and zooming.

Fixation is achieved by combining closed-loop control of the camera, shown in FIG. 1 as closed-loop control line 107, with electronic stabilization. The control loop is driven by measuring a centering error e, i.e. the image distance Is between the center of the current frame $F_c$ and the position of the point corresponding to the center of the display reference frame $F_o$, as shown in equation (3).

$$e = {}_0^cM \begin{bmatrix} 0 \\ 0 \\ 1 \end{bmatrix} \quad (3)$$

when using image coordinate systems in which the image center is <0,0>. The matrix $_0^cM$ may be obtained by inverting $_c^0M$, which was computed as part of the electronic stabilization process.

The centering error e can be translated into pan and tilt corrections using knowledge of the kinematic chain mapping the pan and tilt spaces to image coordinates. Within a simple proportional-integral (PI) negative feedback loop, the pan and tilt motors may be commanded to achieve a velocity proportional to this correction. Simple PI control suffices due to the electronic stabilization that is performed in conjunction with fixation. This provides a stable view even if the fixation motor control loop may lag or oscillate due to measurement and actuator latencies, or turbulence of the camera platform.

It will also be appreciated that augmenting motor fixation with electronic stabilization is advantageous because typical motor configurations allow control only over the camera pan and tilt and can, therefore, stabilize a scene only when the image motion is translational, i.e., when there is no camera rotation about the optical axis. Electronic image alignment can compensate for more complex camera motion and can hold the dominant surface in the image stationary, leaving only residual motion due to parallax and independent motion. This greatly facilitates the observation of fine scene details, whether by a human or by vision processing. A further advantage of electronic stabilization is that it allows a human operator to specify new fixation points within the field of view using a stable display. This aids operator interaction with the system.

Changing the fixation point may be performed by imposing a new display reference frame, which is shifted from the old frame by a user-specified δx and δy. This shift can be imposed on the stabilization and fixation processes, by changing the transform $_r^0M$ that maps the alignment reference to the display reference frame. This new transform, $_r^0M'$ is shown in equation (4).

$$_r^0M' = {_r^0M} + \begin{bmatrix} 0 & 0 & \delta x \\ 0 & 0 & \delta y \\ 0 & 0 & 0 \end{bmatrix} \quad (4)$$

The inverse of $_c^0M = {_r^0M'} \cdot {_c^rM}$ may be used as a measure of centering error relative to δx and δy, the new fixation point.

It will further be appreciated that care must be taken with the transformation matrices to avoid introducing fixation error due to lags in the control loop. If $_r^0M$ is simply redefined to be an identity matrix, then whichever point happens to be in the center of the pre-stabilized current frame will become the new fixation point. This center point is unlikely to be the previous fixation point due to motor latencies within the system. In order to avoid introducing this error, it is desirable to ensure that the old fixation point becomes the new fixation point in the new display reference image. This can be done by using the estimate of centering error e, which measures the position of the original fixated point in the current image. After replacing the display reference image with the current image, the original fixation point can be brought to the center of the new display reference frame by shifting the new display reference by e, as described above. This fixation on the target may be maintained by setting $_r^0M'$, as shown in equation (5).

$$_r^0M' = \begin{bmatrix} 0 & 0 & \delta_x \\ 0 & 0 & \delta_y \\ 0 & 0 & 0 \end{bmatrix} \quad (5)$$

Figure 2:
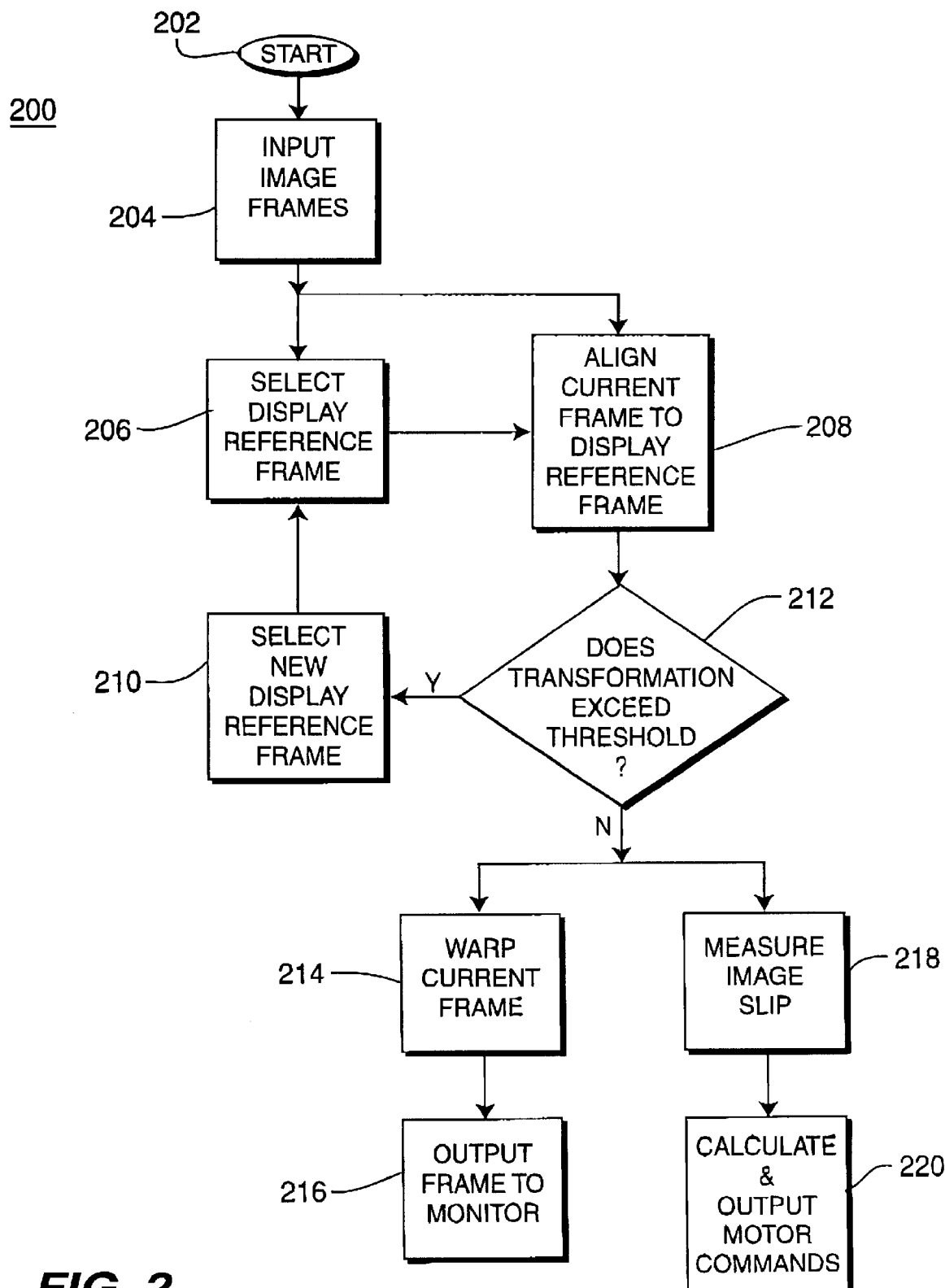
FIG. 2 is a flow diagram of a method for fixating a camera on a target using display reference frames for alignments.

FIG. 2 depicts a flow diagram of a method for fixating a camera on a target point using image alignment. The method is represented as an executable software routine 200 that begins at step 202 and proceeds to step 220. Steps 206–220 are repeated on each iteration of the control loop. At step 204, the routine is provided with a plurality of input image frames. At step 206, a display reference frame is selected. At step 208, the current frame is aligned to the display reference frame, as previously described. The magnitude of the coefficients of the parametric transformation that maps the current frame to the display reference frame is examined. If the magnitude of selected coefficients (e.g., those corresponding to image rotation) is larger than some predetermined threshold, the display reference frame is replaced with the current reference frame in step 210. The coordinates of the fixation point in the new display reference frame is based on the coordinates of the fixation point in the previous display reference frame and the estimated transformation between the current frame and the previous frame, as previously described.

Once the mapping from current to reference images is obtained, then by inverting this transform, via straightforward mathematics, the mapping from reference frame to current frame may be obtained. Using this mapping, and the image coordinates of the fixation point in the reference image, the image coordinates of the fixation point in the current frame is computed. The image slip between the current frame and the reference frame is computed by subtracting the coordinates of the fixation point in the reference frame from the coordinates of the fixation point in the current frame. Alternatively, image slip may be computed by transforming the first coordinate location into the coordinate system of the current image using the estimated mapping, and then subtracting the resulting location from the location of the center point or other specified point in the current image. Having computed image slip in step 218, motor commands are calculated and provided as an output in step 220. By using knowledge of the kinematic chain that represents the mechanics of the motorized camera platform and the position and orientation of the camera relative to the platform, the image slip may be converted to camera angular and position corrections that will re-align the camera so that the image coordinate of the fixation point in subsequent imagery will match that in the reference frame. (This is described in more detail below.) The motors may be commanded to achieve this correction using either position control or velocity control, two well-known concepts in robotics and control theory. The fixation system operates in a closed loop configuration, using control laws such as PID or Kalman-filter-based laws, again according to principles from closed-loop feedback control.

Finally, the computed image mapping from current frame to reference frame may also be used to electronically stabilize the current frame. This is accomplished in step 214 by warping the current frame by the computed parametric image transformation. This warped image may be sent, in step 216, to either a display for viewing or to further image processing steps. There are several important benefits to performing electronic warping. Warping may stabilize the scene in ways that are not achievable with mechanical techniques or translation only motion estimation. Specifically, it may compensate for image rotations corresponding to rotations of the camera platform around axes that may not be stabilized in all mechanical stabilization systems. Further, it may compensate for image scaling and skewing due to translation of the camera platform or zooming of the camera. Also, electronic stabilization can make the camera appear to be fixating perfectly even when the camera closed-loop control is not perfect. This is important because perfect closed-loop control is often difficult due to imprecision on the pan/tilt position encoders, latencies in error measurement, long communications latencies between the time a motor command is issued and the time it is executed by the pan/tilt motors, and turbulence of the camera platform.

The above described a basic fixation control loop, wherein the reference image (frame) is varied. It will be understood that the reference image may be obtained by simply grabbing the current image at certain time instants. This is for the benefit of a human viewer. As the platform moves, the scene perspective changes. (Consider for example, an airplane flying circles or ellipses around a fixation point on the ground.) In order for the human viewer to be able to view the stabilized output, but still have the reference coordinate system be somewhat similar to his current coordinate system, the reference image must be periodically replaced. Another reason for replacing the reference image may be to prevent the magnitude of the parametric transformation from exceeding the capabilities of a limited hardware image warper.

The algorithm shown in FIG. 2 is one embodiment of this invention, using fixation based purely on display reference images (frames). When using fixation based purely on display reference images, however, the fixation point may "drift" off the desired point. This drift is due to small errors in the image alignment that may accumulate every time the display reference is replaced, specifically when the coordinates of the fixation point in the new display reference image are computed. It may be desirable, therefore, to add a second type of reference image the "target" reference image. A "target" reference image may be used in place of the "display" reference image to reset the fixation point to the desired point. Thus, computer system 104 may store a collection of target reference images. The current frame may be added to the collection, if selected coefficients of the transformation between the current frame and the original frame, obtained at the start of fixation, exceed some threshold and there is no target reference image already in the collection that has a similar transformation. In this manner, the computer system may accumulate a set of target reference images that reflect the changes in viewpoint as the camera is fixating. For example, the camera platform may be moving on a repeating course, such as an aircraft flying circles or ellipses around a fixation point. Thus, once the aircraft starts to repeat its course, there may exist target reference images that are similar to the current image. The best (i.e. most similar) target reference may be located by comparing the current estimated image transform relative to the starting frame to that transform stored with each target reference. Periodically, the display reference may be aligned to that target reference so that the fixation point in the display reference may be reset to lie on the same 3D point as that fixation point in the target reference.

Figure 3:
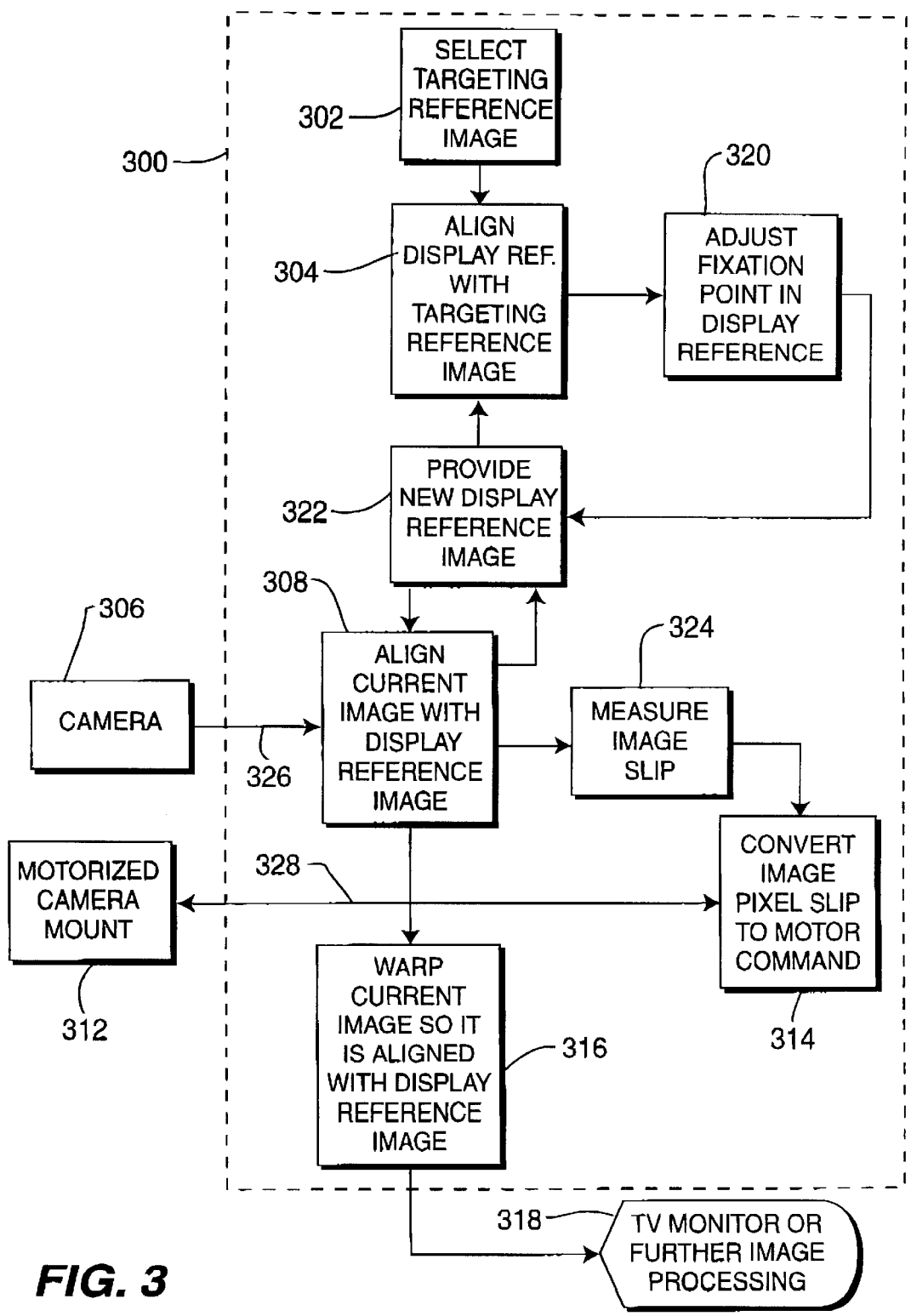
FIG. 3 is a flow diagram of a method for fixating a camera on a target using display reference frames and targeting reference frames for alignment.

An embodiment using target reference images is depicted in FIG. 3. As shown, executable software routine 300 receives a plurality of input images (frames) by way of input line 326. These input images are provided to modules 304 and 308. Module 308 aligns the current image with a display reference image, as was described previously for executable software routine 200 of FIG. 2. If it is determined by module 322 which the magnitude of the coefficients of the parametric transformation which maps the current image to the display reference image is larger than some predetermined threshold, the display reference image is replaced with the current reference image. Image slip is measured by module 324 and converted into motor commands by module 314. As described above, motorized camera mount 312 is mechanically aligned by way of feedback control loop line 328. Also, module 316 electronically warps the current image so it is aligned with the display reference image. The image is sent to TV monitor 318 or it may be sent to another module (not shown) for further image processing. All of these modules are similar to the modules described above.

Now the modules which are effective in comparing the current image with a target image are described. As mentioned earlier, a collection of target reference images may exist in a database (not shown). From this collection, module 302 selects a target reference image. This could be performed, for example, as follows. Suppose that associated with each target reference image t is a transformation $_t^fM$ that aligns it to the original frame f,i e. the initial frame f when the fixation process was initially begun. Also suppose that a similar transform $_c^fM$ is computed that aligns the current frame c to the initial frame. (Both such transforms may be computed by cascading transformations $_c^TM$ in a manner similar to that described earlier in this application.) Module 302 could select the target reference image t whose transform $_t^fM$ is most similar to $_c^fM$.

Having received the target reference image, module 304 electronically aligns the display reference image to the target reference image. The alignment process performed by module 304 is similar mathematically to the alignment process performed by module 308. Since the desired fixation point in the target reference is known from the database, then the fixation point coordinates in the display reference can be reset by module 320, using the computed alignment, to lie on the same 3D point as that fixation point in the target reference. Module 322 provides the display reference image along with the new fixation point in that image to modules 304 and 308. Image slip is measured by module 324 and output to module 314 for mechanical alignment of motorized camera mount 312.

Figure 4:
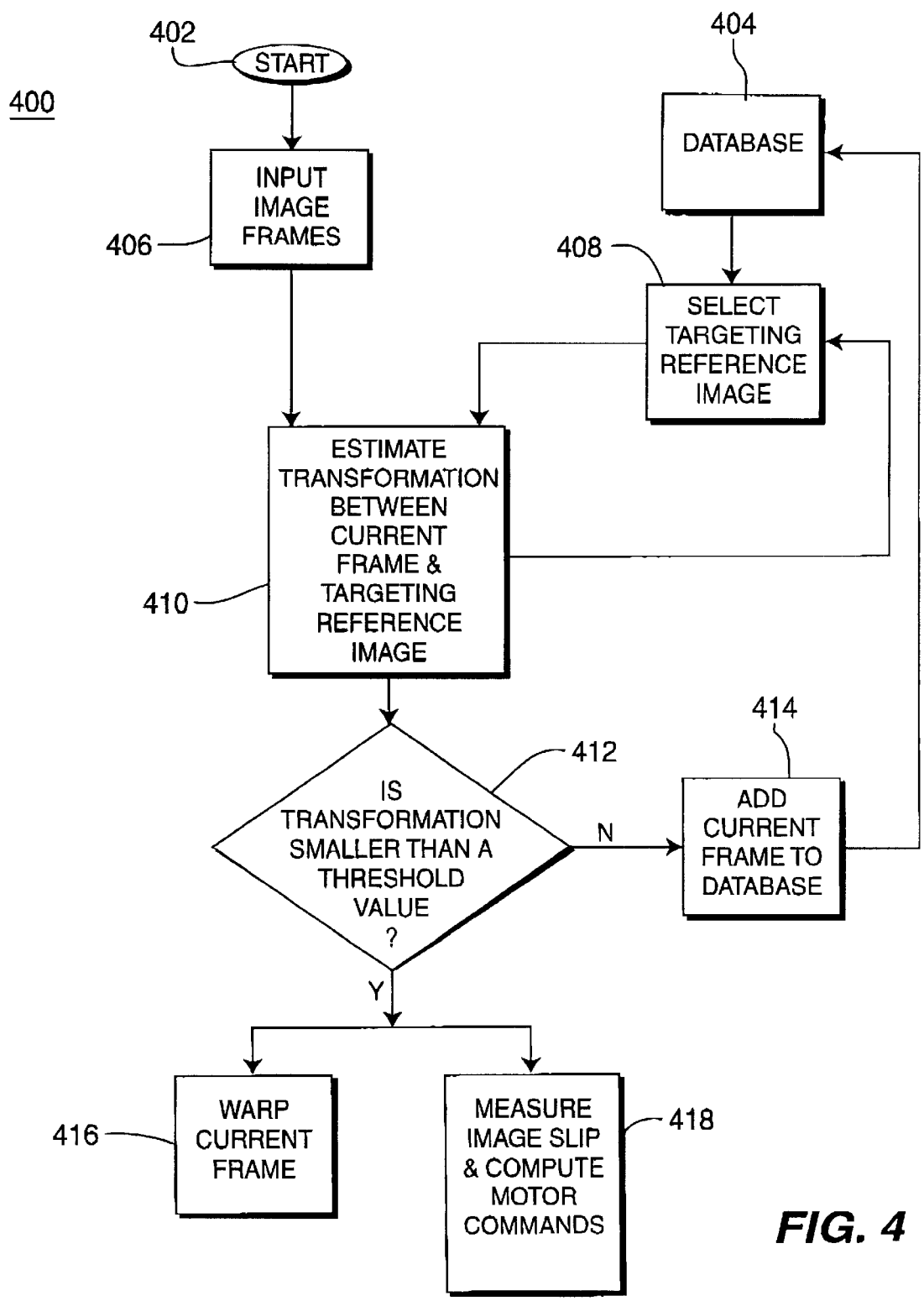
FIG. 4 is a flow diagram of a method for adding targeting reference frames to an existing database containing targeting reference frames.

The method in which the current frame is added to the collection of target reference images is shown in FIG. 4. As shown, executable software routine 400 starts the method with step 402 and is provided with a set of input image frames into module 406, in the same manner as described earlier. Module 408 selects a targeting reference image from database 404. A parametric transformation that maps the current image (from the input image frames) to the selected targeting reference image is obtained in module 410. Parametric transformations are obtained between the current image and each of the other targeting reference images in the database. If the coefficients of the transformation exceed a predetermined threshold as determined by module 412, then the current image is added to the database collection by module 414. The method of warping the current frame to the selected targeting reference image performed by module 416 and the method of measuring image slip and computing angular motor commands performed by module 418 are the same as the methods described above.

In order for the camera to fixate a target, it must first acquire the target in its field of view. In many situations, the 3D coordinates of the target point as well as the camera pose are both known approximately. As a result, the camera may be pointed approximately at the target point simply by using the kinematic chain. A method for refining this aim (using the targeting reference mechanism) by aligning the resulting image to a database view of the scene in which the location of the target is known is now described.

In airborne surveillance scenarios, it is common for the geodetic coordinates of a desired target to be known from GPS or photogrammetry. Similarly, the aircraft's geodetic position and orientation are known, respectively, from on-board GPS and AHRS (Attitude Heading Reference System) devices.

With these measurements, camera pan and tilt, which are required to image the target coordinates may be solved. The first step transforms target and aircraft geodetic coordinates to a 3D local vertical coordinate system (LVCS) that is referred to herein as the world coordinate system W. Using known techniques, the target world coordinates $^Wp$ and aircraft world coordinates $^Wa$ may be obtained. These may be represented homogeneously as 4×1 vectors whose fourth element is 1. In this world coordinate system, the X axis points east, the Y axis north, and Z axis points up.

Next, a 4×4 matrix, $_W^AM$, that maps homogeneous world coordinates to an aircraft-centered coordinate system is defined by equation (6):

$$_W^AM = \left[ \begin{array}{c|c} Ry(-\psi_r)Rx(-\psi_p)Rz(\psi_h) & -(W_a) \\ \hline 0 & 1 \end{array} \right] \quad (6)$$

where $R_{x,y,z}$ denotes clockwise rotation around the X, Y, or Z axes, respectively, and $\psi_r$, $\psi_p$, and $\psi_h$, are the roll, pitch, and heading measured by the AHRS unit.

To solve for the pan and tilt angles that image the target, the target world coordinates $^Wp$ must be transformed into the coordinate system of the camera turret $^Tp$. The turret coordinate system is the coordinate system with respect to which the camera pans and tilts. It is different from the aircraft coordinate system because it is almost mechanically impossible to mount the turret with its baseplate exactly parallel to the AHRS axes; a small relative orientation offset is usually present. This offset is significant when aiming at targets using a narrow field of view. As a result, $_A^T M$, a 4×4 matrix that maps the aircraft coordinate system to the turret coordinate system, must be estimated. It is easier, however, to estimate a 3×3 rotation component of $_A^T M$ by recording a set of images and their associated aircraft poses, and manually designating a 3D point with known coordinates in each image. The rotation matrix may then be estimated using Horn's quaternion method. (B. K. P. Horn, "Closed-Form Solution of Absolute Orientation Using Unit Quaternions," Journal of the Optical Society of America A, April 1987.) With $_A^T M$ and $_W^A M$ the homogeneous coordinates of the target in the turret coordinate system may be computed, as shown in equation (7):

$$T_p = {_A^T M} \cdot {_W^A M} \cdot W_p \qquad (7)$$

The desired pan θ and tilt φ can then be computed according to equations (8) or (9):

$$\theta = \arctan(T_{p_x}/T_{p_y}) \qquad (8)$$

$$\phi = \arctan\left(T_{p_z} / \sqrt{T_{p_x}^2 + T_{p_y}^2}\right) \qquad (9)$$

The above described camera aim may be improved through the image alignment of this invention. In many surveillance scenarios, imagery of the target, coupled with associated aircraft pose when the imagery was acquired, is available in advance from prior surveillance missions. In such database imagery, the target location may be specified off-line by hand.

A database image $F_d$ may be warped to predict how the scene would appear given the current camera pose. To do so, mapping is performed from world coordinates to image coordinates and vice versa. The symbol Ω is used herein to denote the set of viewing parameters consisting of position $^W a$, orientation $\psi_r, \psi_p, \psi_h$, pan θ, tilt φ, and focal length f.

Given an image $F_i$, one can form a 3×4 matrix $_w^i L$ that maps world coordinates to projective image coordinates in $F_i$:

$$_w^i L(\Omega) \equiv {_C^i M(f)} \, _T^C M(\theta \phi) \, _A^T M \, _W^A M(^W a : \psi_r, \psi_p, \psi_h) \qquad (10)$$

where $_T^C M(\theta, \phi)$ is a 4×4 matrix that maps the turret coordinate system to the camera-centered coordinate system as a function of pan and tilt, and $_C^i M$ is a 3×4 matrix that maps homogeneous 3D points to homogeneous 2D points on the image plane as a function of the camera focal length f (nominal values for other intrinsic camera parameters are assumed).

Assuming that the surface being imaged is planar, then the $_w^i L$ matrix may be inverted as follows:

$$_i^W L \equiv {_w^i L}^{-1} = \left(I - \frac{mn^T}{n \cdot m}\right) M^* \qquad (11)$$

where m is a null vector of $_w^i L$, M* is the 4×3 right inverse of $_w^i L$, and n is the 4×1 normal vector that defines the planar surface in world coordinates. In this embodiment, the surface was assumed to be a horizontal ground plane, i.e. n=[0 0 1 0]$^T$.

With these mathematical concepts, a projective transform $_d^i M$ that warps the database image $F_d$ with viewing parameters $\Omega_d$ to predict how the scene would appear given the current viewing parameters $\Omega_i$ may be obtained as follows:

$$_d^i M(\Omega_i) = {_w^i L(\Omega_i)} \, _d^W L(\Omega_d) \qquad (12)$$

$F_p$ is defined as the prediction image obtained by warping the database image $F_d$ by $_d^i M$. If there were no latencies or calibration errors in measuring the viewing parameters, and if the scene met the assumption of planarity, $F_p$ would be identical to the current image $F_i$. In practice, however, there is still a substantial misalignment between $F_i$ and $F_p$. The perspective effects on the ground plane are appropriately modeled, but there is often a significant translational offset between the two. This is because, in airborne scenarios with the target a long distance away, camera pan and tilt may change very rapidly and accurate measurement of these angles will be impaired by latency.

Since the location of the target is known in the database image $F_d$, its location is also known in the predicted image $F_p$. Therefore, by using $F_p$ as the targeting reference image, the target location in the current image is known and the fixation point may be adjusted accordingly. In the method just described, the predicted image is synthesized from a previous image using known information about the position and orientation of the camera at the time the previous image was taken, as well as the current position and orientation of the camera. It is important to note that the predicted image may similarly be synthesized from a mosaic image which is constructed from multiple previous images, a geometric database model of the scene, an elevation map of the scene, or some combination of all of these.

What is claimed:

1. A method for fixating a camera, mounted on a motorized mount, on a target point comprising the steps of:
    a) receiving a plurality of images representative of a scene;
    b) selecting, within the plurality of images, a first display reference image containing the target point at a first coordinate location;
    c) estimating, in a current image within the plurality of images, a transformation that maps the current image to the first display reference image;
    d) estimating a second coordinate location of the target point in the current image using the transformation;
    e) computing an image slip between the target point in the current image and the target point in the first display reference image;
    f) converting the image slip into an angular correction for fixating the camera; and
    g) implementing the angular correction by using closed-loop control with the motorized mount.

2. The method of claim 1, wherein step (e) includes computing the image slip by subtracting the second coordinate location from the location of a point in the current image.

3. The method of claim 2, wherein step (g) includes closed-loop control using one of a proportional plus integral plus derivative (PID) control system and a Kalman filtering based control system.

4. The method of claim 1 wherein step (c) includes estimating the transformation using one of an affine model algorithm and a projective model algorithm.

5. The method of claim 1 further comprising the step of:
    (i) determining a magnitude of selected coefficients of the transformation, and replacing the first display reference image with a second display reference image when the determined magnitude exceeds a threshold.

6. The method of claim 1 wherein a targeting reference image is selected having known target point coordinates, and the method further includes the steps of:

(i) estimating a further transformation that maps the targeting reference image to the display reference image; and (j) adjusting the target point of the display reference image to the target point of the targeting reference image using the further transformation.

7. The method of claim 6 wherein the targeting reference image is obtained from a database, and the database includes targeting reference images having been synthesized from one of a previous image, a known image mosaic, and a known geometric model of a scene.

8. The method of claim 6 wherein the targeting reference image is obtained from a database, and the database includes targeting reference images having been synthesized from a previous image and a known geometric model of a scene.

9. The method of claim 6 wherein the targeting reference image is obtained from a database, and the database includes targeting reference images having been synthesized from a known image mosaic and a known geometric model of a scene.

10. The method of claim 1 wherein step (f) includes estimating a relative orientation between the camera and the target point in a coordinate system; and providing the angular correction in the same coordinate system.

11. The method of claim 10 wherein the coordinate system is a world coordinate system and the angular correction uses Horn's quaternion method.

12. The method of claim 1 further including the step of:

h) warping the current image using the transformation to align the current image with the first display reference image.

13. The method of claim 12, wherein step (h) includes sending the warped image to one of a display for viewing and an image processor for processing.

14. In fixating a camera on a target point, a method for maintaining a database of targeting reference images, comprising the steps of:

a) receiving a plurality of images representative of a scene;

b) selecting a targeting reference image from the database;

c) estimating, in a current image within the plurality of images, a first transformation that maps the current image to the targeting reference image;

d) comparing the first transformation to other transformations between the current image and the other targeting reference images in the database; and e) adding the current image to the database, if the first transformation is sufficiently different from the other transformations between the current image and the other targeting reference images in the database.

15. The method of claim 14 further including the following steps:

f) estimating a coordinate location of the target point in the current image using the transformation;

g) computing an image slip between the target point in the current image and the target point in the targeting reference image;

h) converting the image slip into an angular correction for fixating the camera; and i) implementing the angular correction by using closed-loop control with a motorized mount receiving the camera.

16. The method of claim 15 further including the step of:

j) warping the current image using the first transformation to align the current image with the targeting reference image.

17. The method of claim 14 wherein step (e) includes the step of adding the current image to the database if a magnitude of selected coefficients of the first transformation is greater by a threshold value than any other magnitude of selected coefficients of transformations between the current image and each of the other targeting reference images.

18. Apparatus for fixating a camera on a target point comprising:

a motorized mount for fixating the camera;

a computer processor for processing a plurality of images representative of a scene including:

means for selecting within the plurality of images a first display reference image containing the target point at a first coordinate location;

means for deriving, from a current image within the plurality of images, a transformation that maps the current image to the first display reference image;

means for estimating a second coordinate location of the target point in the current image using the transformation;

means for computing an image slip between a point in the current image and a point in the first display reference image;

means for converting the image slip into an angular correction for fixating the camera; and a closed loop control system which implements the angular correction by controlling the motorized mount.

19. The apparatus of claim 18 wherein means for modifying the angular correction includes a closed-loop control system between the computer processor and the motorized mount, the closed-loop control system using one of a proportional plus integral plus derivative (PID) control algorithm and a Kalman filtering based control algorithm.

20. The apparatus of claim 18 wherein the transformation is one of an affine model algorithm and a projective model algorithm.

21. The apparatus of claim 18 including means for replacing the first display reference image with a second display reference image when a magnitude of selected coefficients of the transformation exceeds a predetermined magnitude.

22. The apparatus of claim 18 including:

means for warping the current image using the transformation to align the current image with the first display reference image.

23. The apparatus of claim 22 including:

an output device for presenting the warped current image as the output image of the camera.

24. A computer-readable medium having stored thereon a plurality of instructions, the plurality of instructions including instructions which, when executed by a processor cause the processor to perform the steps of:

a) receiving a plurality of images representative of a scene;

b) selecting, from within the plurality of images, a first display reference image containing a target point at a first coordinate location;

c) estimating in a current image, within the plurality of images, a transformation that maps the current image to the first display reference image;
d) estimating a second coordinate location of the target point in the current image using the transformation;
e) computing an image slip between a point in the current image and a point in the first display reference image;
f) converting the image slip into an angular correction for fixating a camera mounted on motorized mount; and
g) implementing the angular correction by using closed-loop control with the motorized mount.

25. The computer readable medium of claim 24, wherein the current image is presented to a display for viewing.

26. The computer readable medium of claim 24, wherein the current image is presented to an image processor for further processing.

27. The method of claim 24 further including the step of:

h) warping the current image using the transformation for alignment with the display reference image.

* * * * *